(12) United States Patent
Suxena (10) Patent No.: US 10,791,448 B2
(45) Date of Patent: Sep. 29, 2020

(54) EMERGENCY MESSAGING FROM A LOCKED MOBILE DEVICE

(71) Applicant: T-Mobile USA, Inc., Bellevue, WA (US)

(72) Inventor: Vishesh Raj Suxena, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/365,629

(22) Filed: Mar. 26, 2019

(65) Prior Publication Data

US 2019/0387387 A1 Dec. 19, 2019

Related U.S. Application Data (63) Continuation of application No. 16/009,161, filed on Jun. 14, 2018.

(51) Int. Cl.
*H04W 4/90* (2018.01)
*H04M 1/725* (2006.01)
(Continued)

(52) U.S. Cl.
CPC ............ *H04W 4/90* (2018.02); *H04B 7/0617* (2013.01); *H04B 7/0619* (2013.01); *H04B 7/10* (2013.01);
(Continued)

(58) Field of Classification Search
CPC ......... H04W 4/90; H04W 4/22; H04W 76/50; H04W 4/046; H04W 8/18; H04W 36/0022; H04W 36/0033; H04W 76/10; H04W 48/18; H04W 4/12; H04W 4/029; H04L 1/06; H04L 29/06027; H04B 7/0617;
(Continued)

(56) References Cited

U.S. PATENT DOCUMENTS

| 10,299,102 B1 | 5/2019 | Suxena |
| 2010/0003959 A1 | 1/2010 | Coppage et al. |

(Continued)

OTHER PUBLICATIONS

International Searching Authority, International Search Report and Written Opinion, PCT Patent Application PCT/US2019/037386, dated Oct. 31, 2019, 13 pages.

*Primary Examiner* — Fred A Casca
(74) *Attorney, Agent, or Firm* — Perkins Coie LLP (57) ABSTRACT

The disclosed system provides a facility to enable an emergency messaging session on a locked mobile device. In response to receiving a request on a locked mobile device to initiate an emergency messaging session, the system displays an interface that may enable a user of the mobile device to select a type of emergency and/or enter a customized message to be transmitted to an emergency services provider. The displayed interface additionally may include options to automatically or manually send specified types of information to an emergency responder, such as a physical location of the mobile device or medical, personal contact, or residence information of the user of the mobile device. While an emergency messaging session is in progress, the disclosed system may continually send updated information to the selected emergency provider, such as a location of the mobile device or biometric information associated with a user of the mobile device.

20 Claims, 9 Drawing Sheets

(51) Int. Cl.
*H04W 4/029* (2018.01)
*H04W 4/12* (2009.01)
*H04B 7/06* (2006.01)
*H04B 7/10* (2017.01)

(52) U.S. Cl.
CPC ....... *H04M 1/72536* (2013.01); *H04W 4/029* (2018.02); *H04W 4/12* (2013.01); *H04M 1/72541* (2013.01); *H04M 1/72577* (2013.01)

(58) Field of Classification Search
CPC ............... H04B 7/0613; H04B 7/0697; H04M 1/72536; G08B 25/016; G08B 25/006; G08B 13/00; G08B 21/0453
USPC .................................... 455/404.1, 404.2, 411
See application file for complete search history.

(56) References Cited

U.S. PATENT DOCUMENTS

| | | | |
|---|---|---|---|
| 2012/0212668 A1* | 8/2012 | Schultz | H04N 5/23206 348/468 |
| 2013/0171958 A1* | 7/2013 | Goodson | H04W 4/90 455/404.2 |
| 2014/0148120 A1 | 5/2014 | Buck | |
| 2015/0350861 A1 | 12/2015 | Soli et al. | |
| 2015/0373516 A1 | 12/2015 | Mitchell, Jr. et al. | |
| 2017/0150335 A1* | 5/2017 | Self | H04W 4/90 |
| 2017/0180964 A1* | 6/2017 | Mehta | H04W 4/90 |
| 2017/0251347 A1 | 8/2017 | Mehta et al. | |

\* cited by examiner

EMERGENCY MESSAGING FROM A LOCKED MOBILE DEVICE

CROSS-REFERENCE TO RELATED APPLICATIONS

This application is a continuation of U.S. patent application Ser. No. 16/009,161, titled "EMERGENCY MESSAGING FROM A LOCKED MOBILE DEVICE," filed Jun. 14, 2018, which is hereby incorporated by reference in its entirety.

BACKGROUND

In an emergency, a mobile device user may need to obtain help as quickly as possible in order to resolve a dangerous or life-threatening situation with the best possible outcome. Although typical mobile devices that allow users to initiate emergency telephone calls from a locked device may be helpful in in certain situations, such emergency telephone calls are not effective in other situations that are encountered by users. For example, a mobile device user who is in the presence of a threatening individual such as a kidnapper or home invader may not be able to place an emergency call, at least because placing such an emergency call would likely be noticed by the threatening individual and escalate the pending threat. As another example, a mobile device user may be experiencing a food choking event, severe laryngitis, or another medical condition that otherwise would prevent the user from being able to speak. In either of these example situations, the mobile device user would not benefit from the ability to place an emergency telephone call and may suffer dire consequences as a result. These and other problems exist with current mobile devices that are limited to emergency telephone calls.

The present technology addresses the aforementioned problems by enabling a user to engage in an emergency texting session from a locked device. By enabling emergency texting, the present technology enables a mobile phone user to obtain critical emergency services when the user must maintain discretion in the presence of an active threat, when the user is unable to speak, or in other life-threatening situations where it would not be practical to initiate a telephone call. Moreover, the present technology allows important information (e.g., medical history, medications, emergency contact information) to be sent automatically to an emergency responder in situations where it would not be practical or possible for an emergency responder to obtain such detailed information via a telephone call from a user who is distraught or injured.

DETAILED DESCRIPTION

The disclosed system provides a facility to allow a user of a locked mobile device to engage in an emergency messaging session with an emergency responder, such as a Public Safety Access Point (PSAP) that may correspond to medical, fire, police, or other types of emergency providers. The system is adapted to operate in various types of telecommunications networks, including second-generation wireless telephone technology (2G) networks, third-generation wireless telephone technology (3G) networks, fourth-generation wireless telephone technology (4G) networks, and long-term evolution (LTE) networks. The system makes use of various industry standards, including 3rd Generation Partnership Project (3GPP) TS 24.423, TS 24.611, TS 24.604, TS 24.607, TS 24.608, TS 24.615, TS 24.623, TS 33.222, and TS 36.423; Internet Engineering Task Force (IETF) RFC 4825 and RFC 7231; and Groupe Speciale Mobile Association (GSMA) IR.92, all of which are herein incorporated by reference in their entirety.

In the disclosed system, a screen of a locked mobile device displays an option to initiate an emergency messaging session. In response to receiving a request from a mobile device user to initiate an emergency messaging session, the disclosed system displays an interface that may enable the user to select a type of emergency and/or enter a customized message to be transmitted to an emergency provider. The interface of the disclosed system additionally may include options to automatically or manually send specific types of information to an emergency responder, such as physical location of the mobile device or medical, personal contact, or residence information of the user of the mobile device. While an emergency messaging session is in progress, the disclosed system may continually send updated information to an emergency provider, such as a location of the mobile device or biometric information associated with a user of the mobile device from a data source connected to the mobile device, such as a heart rate monitor, smart watch, or other wearable device. Alternatively or additionally, the emergency provider or associated server computer can send data back to the user, such as first aid videos, status of and arrival time for emergency personnel, etc.

The disclosed system is adapted to send and receive messages to and from any emergency responder capable of providing assistance to a user of a mobile device, using any number of available messaging standards and protocols. Additional information regarding such emergency communications are discussed in Applicant's U.S. Pat. No. 8,195,121, titled "Method and System for Establishing Messaging Communication with a Service Provider, such as a PSAP (Public Safety Answering Point)," and "PSAP Interim Text-to-9-1-1 Training Documents NENA-REF-002.2-2014" (available at https://www.nena.org/?text_training_docs) as published by the National Emergency Number Association (NENA), both of which are herein incorporated by reference in their entirety. The functionality of the disclosed system may be provided in a mobile phone before the mobile phone is sold or leased to a user, and may operate at an operating system level or below an application level such that the disclosed functionality is always available to the user without the user having to launch an application.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Although not required, aspects and implementations of the system will be described in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Figure 1:
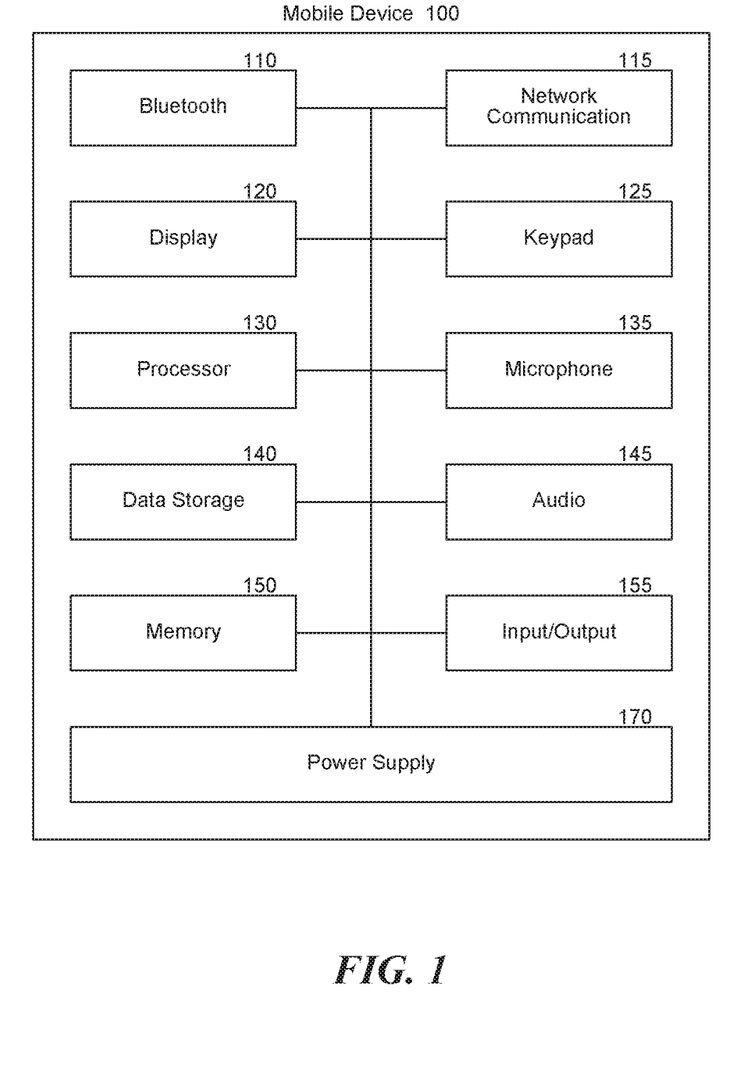
FIG. 1 is a block diagram of a representative mobile device that may engage in an emergency messaging session in accordance with embodiments herein.

FIG. 1 is a block diagram of a representative mobile device 100 that may engage in an emergency messaging session in accordance with embodiments herein. Mobile device 100 typically includes a processor 130 for executing processing instructions, a data storage medium component 140 (e.g., hard drive, flash memory, memory card, etc.), volatile memory and/or nonvolatile memory 150, a power supply 170, one or more network interfaces (e.g., Bluetooth Interface 110; and Network Communication Interface 115, which enables the mobile phone to communicate by transmitting and receiving wireless signals using licensed, semi-licensed or unlicensed spectrum over a telecommunications network), an audio interface 145, a display 120, a keypad or keyboard 125, a microphone 135, and/or other input and/or output interfaces 155. The various components of the mobile device may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications. The stored information may include one or more SIP or Diameter protocol clients capable of generating, transmitting and interpreting syntactically correct SIP or Diameter protocol messages. SIP clients permit the mobile device to register with and communicate via the IMS network.

Mobile device 100 may be virtually any device for communicating over a wireless network. Such devices include application servers or mobile telephones, such as Global System for Mobile Communications ("GSM") telephones, Time Division Multiple Access ("TDMA") telephones, Universal Mobile Telecommunications System ("UMTS") telephones, Evolution-Data Optimized ("EVDO") telephones, Long Term Evolution ("LTE") telephones, Generic Access Network ("GAN") telephones, Unlicensed Mobile Access ("UMA") telephones, and other mobile computers or devices, such as Voice over Internet Protocol ("VoIP") devices, Secure User Plane Location ("SUPL") Enabled Terminals (SETs), Personal Digital Assistants ("PDAs"), radio frequency devices, infrared devices, handheld computers, laptop computers, wearable computers, tablet computers, pagers, integrated devices combining one or more of the preceding devices, and/or the like.

Mobile device 100 may connect to a telecommunications network via a trusted radio access network (RAN) or an untrusted RAN. A single mobile device may be capable of using one or both types of RANs. The RANs may use any wireless communications and data protocol or standard, such as GSM, TDMA, UMTS, EVDO, LTE, GAN, UMA, Code Division Multiple Access ("CDMA") protocols (including IS-95, IS-2000, and IS-856 protocols), Advanced LTE or LTE+, Orthogonal Frequency Division Multiple Access ("OFDM"), General Packet Radio Service ("GPRS"), Enhanced Data GSM Environment ("EDGE"), Advanced Mobile Phone System ("AMPS"), WiMAX protocols (including IEEE 802.16e-2005 and IEEE 802.16m protocols), Wireless Fidelity ("WiFi"), High Speed Packet Access ("HSPA"), (including High Speed Downlink Packet Access ("HSDPA") and High Speed Uplink Packet Access ("HSUPA")), Ultra Mobile Broadband ("UMB"), SUPL, and/or the like.

Figure 2:
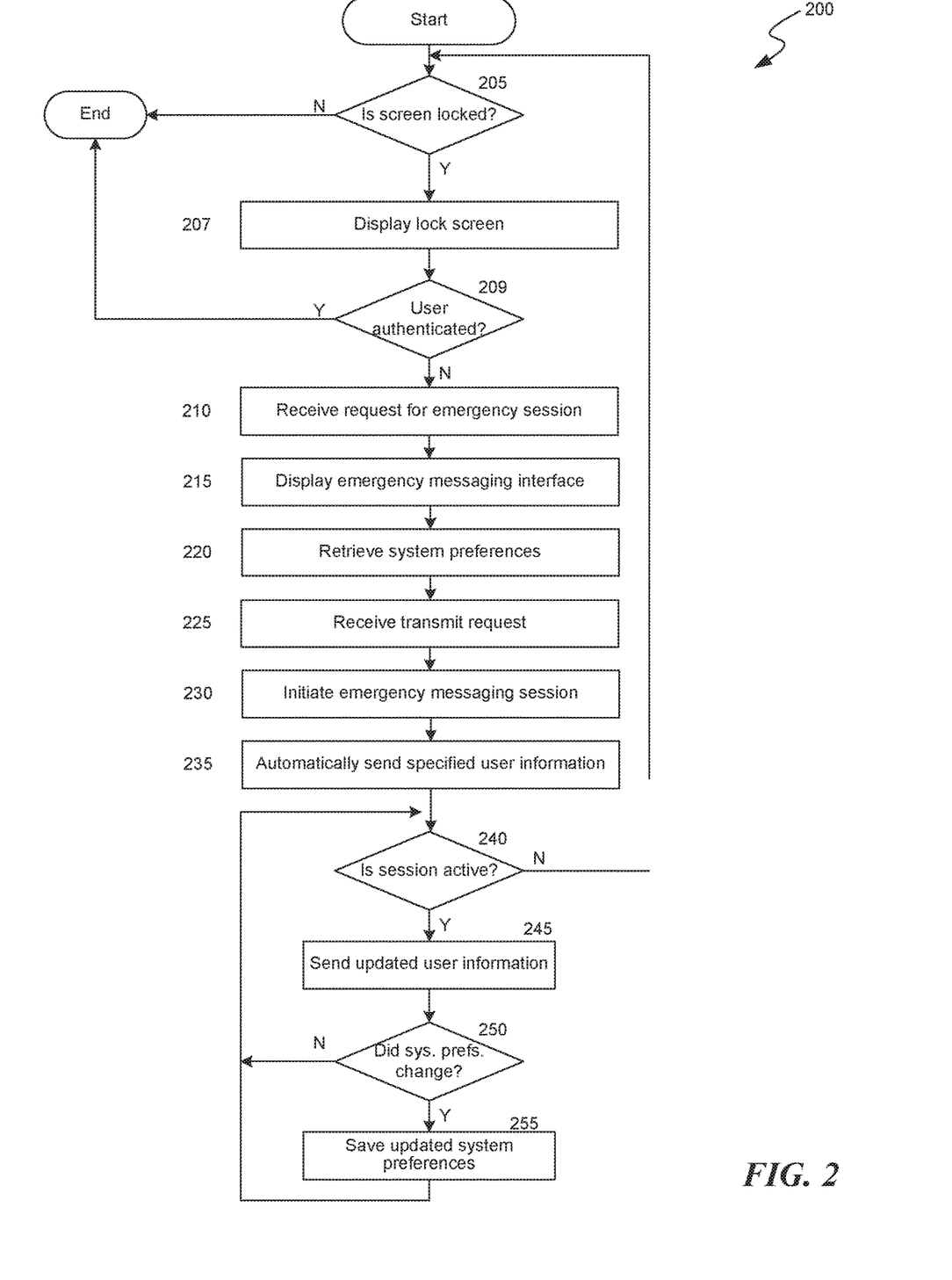
FIG. 2 is a flowchart depicting a procedure for emergency messaging from a locked mobile device in accordance with embodiments herein.
Figure 3:
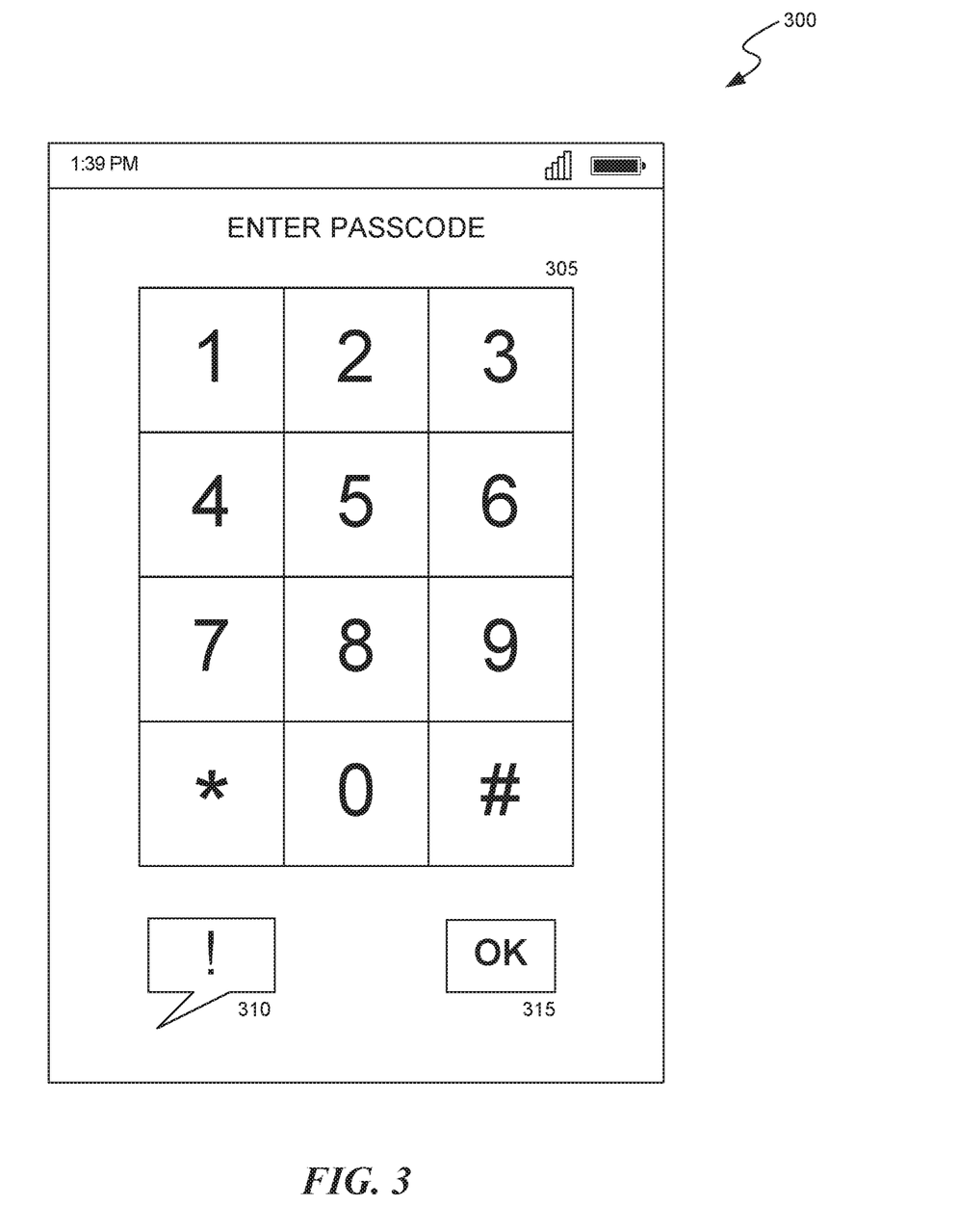
FIG. 3 illustrates an embodiment of a lock screen that is displayed on a mobile device in accordance with embodiments herein.

FIG. 2 is a flowchart that details a procedure for engaging in an emergency messaging session from a locked mobile device in accordance with embodiments herein. At block 205, the emergency messaging system determines whether mobile device 100 is in a locked mode. Mobile device 100 may be in a locked mode at any time that it requires authentication before providing access to core mobile device functions, such as launching applications stored on the mobile device (e.g., mail, calendar, or news applications), obtaining navigation information to a specific destination, initiating or receiving telephone calls, or initiating or receiving messages (e.g., SMS or MMS messages) for non-emergency purposes. Typically, a user of mobile device 100 may provide authentication by entering a password or by providing biometric data such as a fingerprint or a facial image via a lock screen that is presented on the screen of the mobile device. If the system determines at block 205 that mobile device 100 is not in a locked mode, then the emergency messaging procedure 200 ends. However, if the system determines at block 205 that mobile device 100 is in a locked mode, then the system may display a lock screen at block 207 and may restrict usage of the mobile device to emergency messaging sessions with emergency providers only. FIG. 3 illustrates an embodiment of a lock screen that may be displayed on mobile device 100. Lock screen 300 includes a keypad 305 for entering a password. Although lock screen 300 displays a numeric keypad, the system may additionally or alternatively display an alphanumeric keypad to allow a user to enter a password (or an option to toggle between numeric and alphabetic keypads). Additionally, while not shown, lock screen 300 may provide an area for a user to authenticate to mobile device 100 by inputting a gesture or by providing biometric information. Lock screen 300 includes OK button 315, which a user may select when finished entering a password or when finished providing another means of authentication. Lock screen 300 includes an emergency messaging session icon 310, which a user may select to indicate a desire to engage in an emergency messaging session. Although not pictured, in some embodiments lock screen 300 may additionally display an icon to place an emergency telephone call.

Returning to FIG. 2, at block 209, the system determines whether a user of the mobile device has successfully entered authentication credentials. In the embodiment illustrated in FIG. 2, if the system determines that the user has successfully authenticated, then the emergency messaging procedure 200 ends. If the system instead determines that the user has not successfully authenticated, then the system proceeds to block 210. In another embodiment (not shown), if the system determines that the user has successfully authenticated, then the system may present a message on a display of the mobile device. The presented message may ask the user to provide an indication of whether the user wishes to continue the emergency messaging session or cancel the emergency messaging session. If the system receives an indication that the user wishes to cancel, then the emergency messaging procedure 200 ends. If the system receives an indication that the user wishes to continue, then the system proceeds to block 210.

Figure 4:
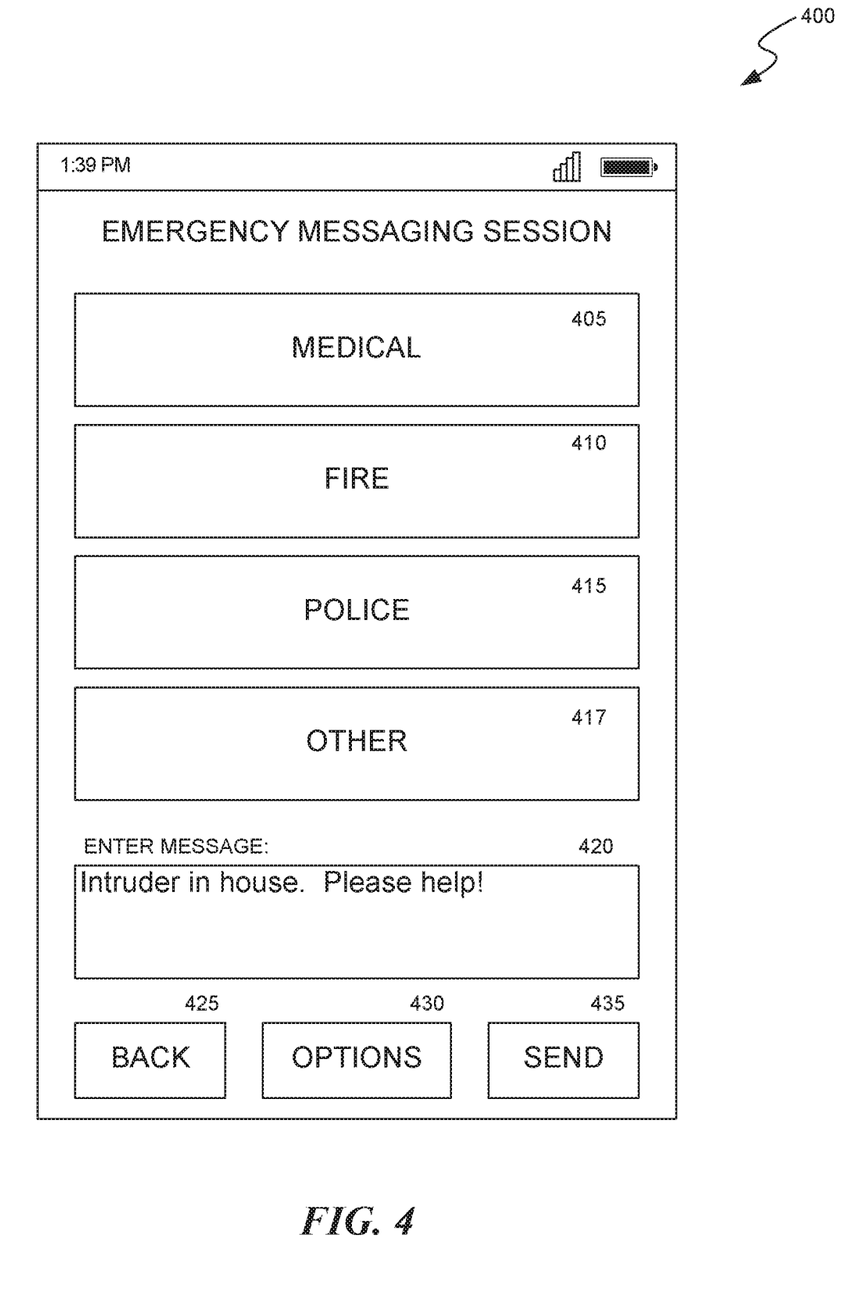
FIG. 4 illustrates an embodiment of an emergency messaging session interface in accordance with embodiments herein.

At block 210, mobile device 100 receives a request to initiate an emergency messaging session. The request may be received via a user selection on the screen of the mobile device, such as when a user selects emergency messaging icon 310 from lock screen 300. The request also may be received when a user speaks a voice command into mobile device 100 (e.g., "text police" or "send emergency message") or inputs a preconfigured gesture into the mobile device. At block 215, mobile device 100 displays an emergency messaging session interface screen in response to receiving the request to initiate an emergency messaging session. FIG. 4 illustrates an embodiment of an emergency messaging session interface 400. The emergency messaging session interface 400 may allow a user to select one or more types of emergency, such as medical (405), fire (410), or police (415). The emergency messaging session interface 400 may allow a user to select an "other" emergency (417) for an emergency that does not fall into any of the displayed categories. In addition, emergency messaging session interface 400 may allow the user to enter optional text in a text field 420 to be sent to an emergency provider. In an embodiment, the disclosed system may send an emergency message to a different telephone number or group of telephone numbers (or to a different PSAP or group of PSAPs) corresponding to the particular selected type of emergency. In another embodiment, the system may send the emergency message to the same telephone number or group of telephone numbers (or to the same PSAP or group of PSAPs) regardless of the selected type of emergency, or in cases where the user has not selected a type of emergency.

Although not shown, in an embodiment, emergency messaging session interface 400 may allow a user to select an option to indicate that the user is the owner of the mobile device or may allow the user to select an option to indicate that the user is not the owner of the mobile device. In this embodiment, the system transmits the selected indication of ownership to the emergency provider along with an emergency message. In some embodiments, the disclosed system may allow the user to specify that the emergency messaging session is a typed or written session only (i.e., an emergency messaging session that includes a typed or written session but does not include a voice session), or a typed or written session that includes a voice session. If the user indicates that a voice session is included, then the disclosed system may initiate a telephone call to the emergency provider in addition to transmitting one or more typed or written messages to the emergency provider.

In the disclosed system, the mobile device may store one or more predetermined telephone numbers corresponding to one or more emergency responders or PSAPs such that a user of the mobile device is not required to enter a telephone number during an emergency. In some embodiments, a telecommunications service provider associated with the mobile device may automatically update one or more telephone numbers for one or more emergency responders or PSAPs upon detecting that the mobile device has entered a particular geographical area. Emergency messaging session interface 400 includes a back button 425 for navigating to a previously displayed screen (such as lock screen 300), an options button 430 for navigating to an options menu (as discussed in more detail herein with respect to FIGS. 6A-6D), and a send button 435 for transmitting an emergency message to an emergency provider.

Figure 5:
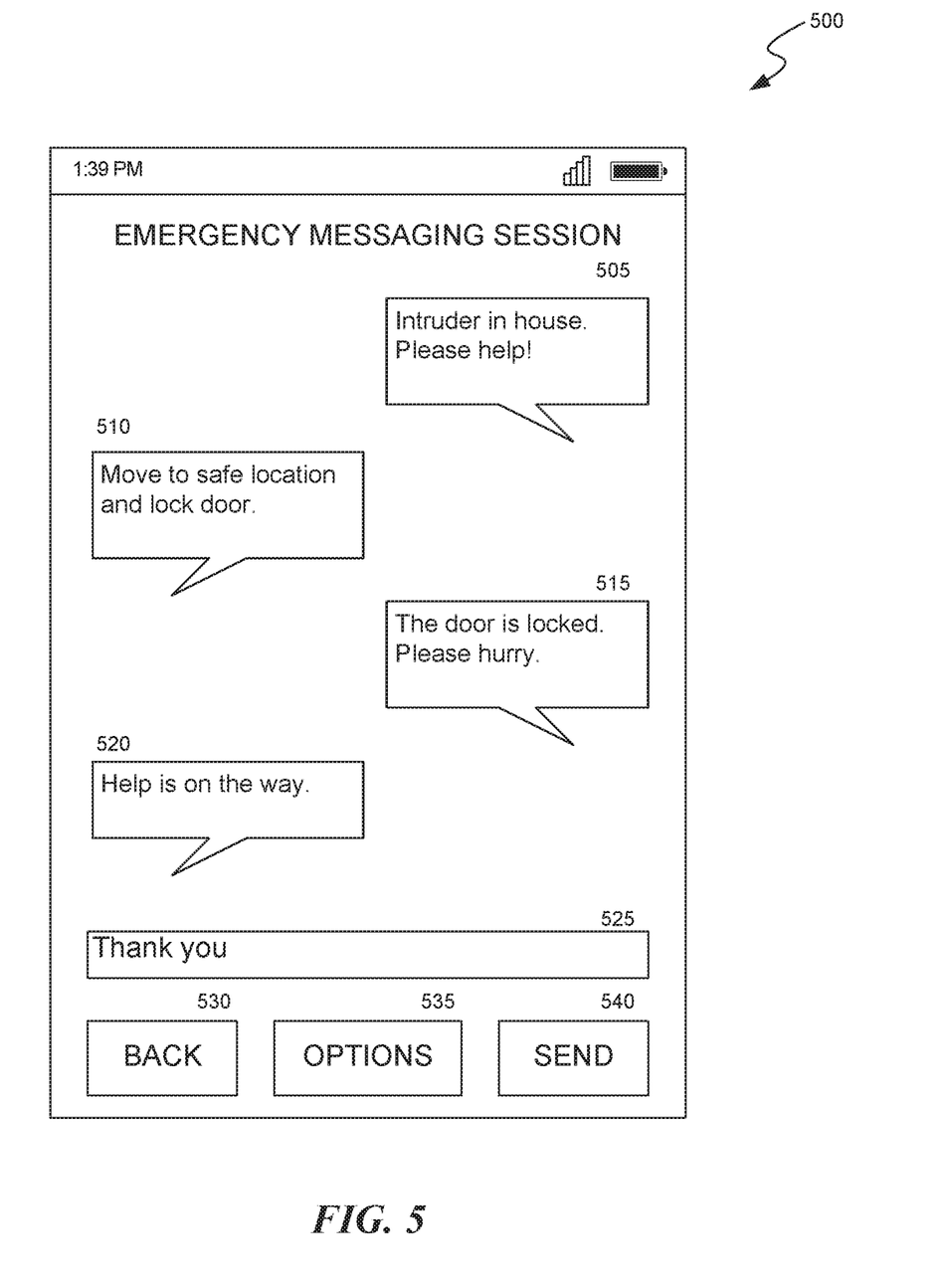
FIG. 5 illustrates an embodiment of a messaging window in accordance with embodiments herein.

In response to receiving a user selection of send button 435, the system may cause mobile device 100 to transmit an emergency message and display a messaging window for enabling a user of the mobile device to engage in an interactive messaging session with an emergency responder. FIG. 5 illustrates an embodiment of a messaging window 500. Messaging window 500 displays messages 505 and 515 sent by the mobile device user, messages 510 and 520 sent by the emergency responder, an area 525 for allowing the mobile device user to enter a new message to the emergency responder, a send button 540 to enable the mobile device user to transmit the new message, an options button 535 to enable the mobile device user to specify system options, and a back button 530 to enable the mobile device user to display a previous screen (such as emergency messaging session interface 400 or lock screen 300).

Figure 6A:
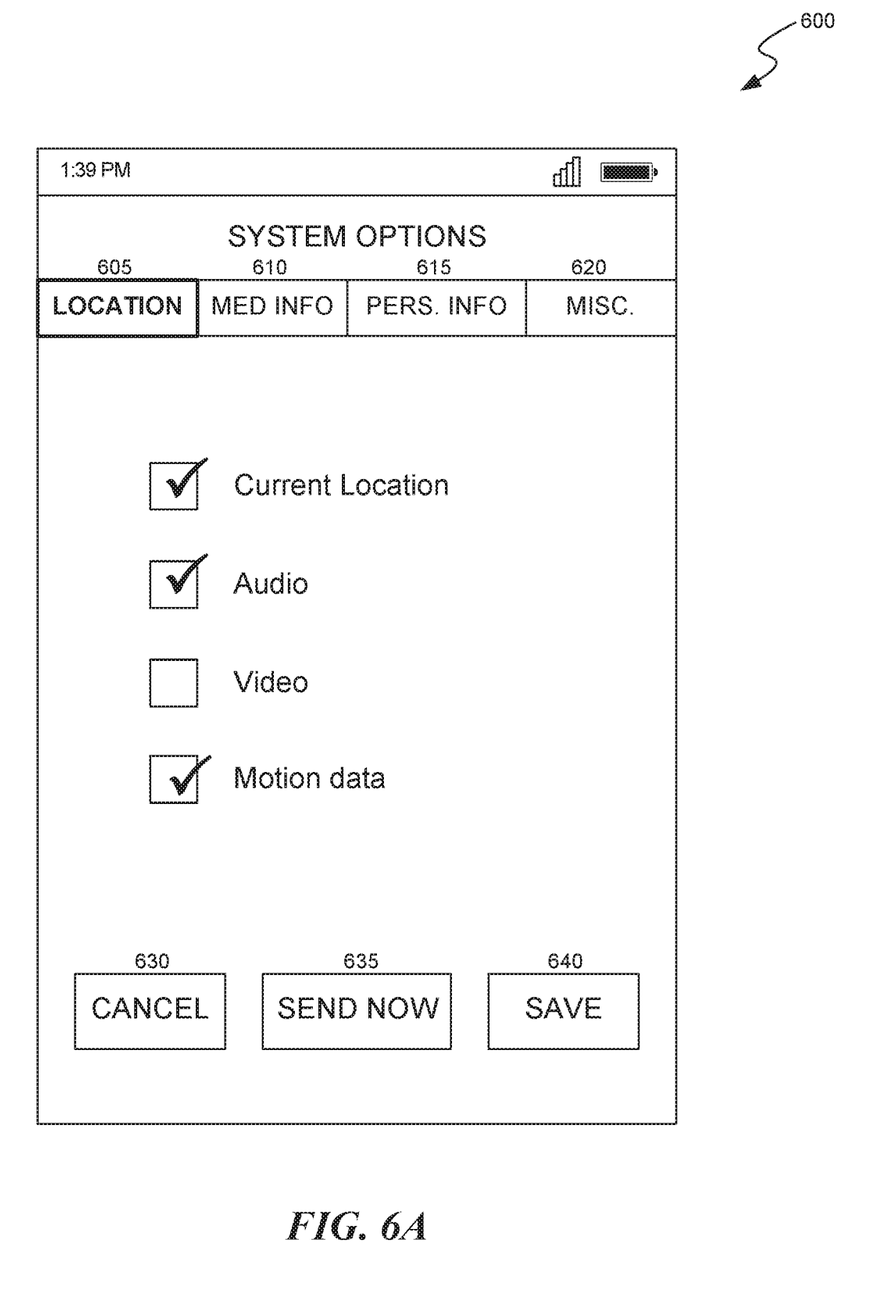
FIGS. 6A-6D illustrate an embodiment of a system options interface in accordance with embodiments herein.
Figure 6B:
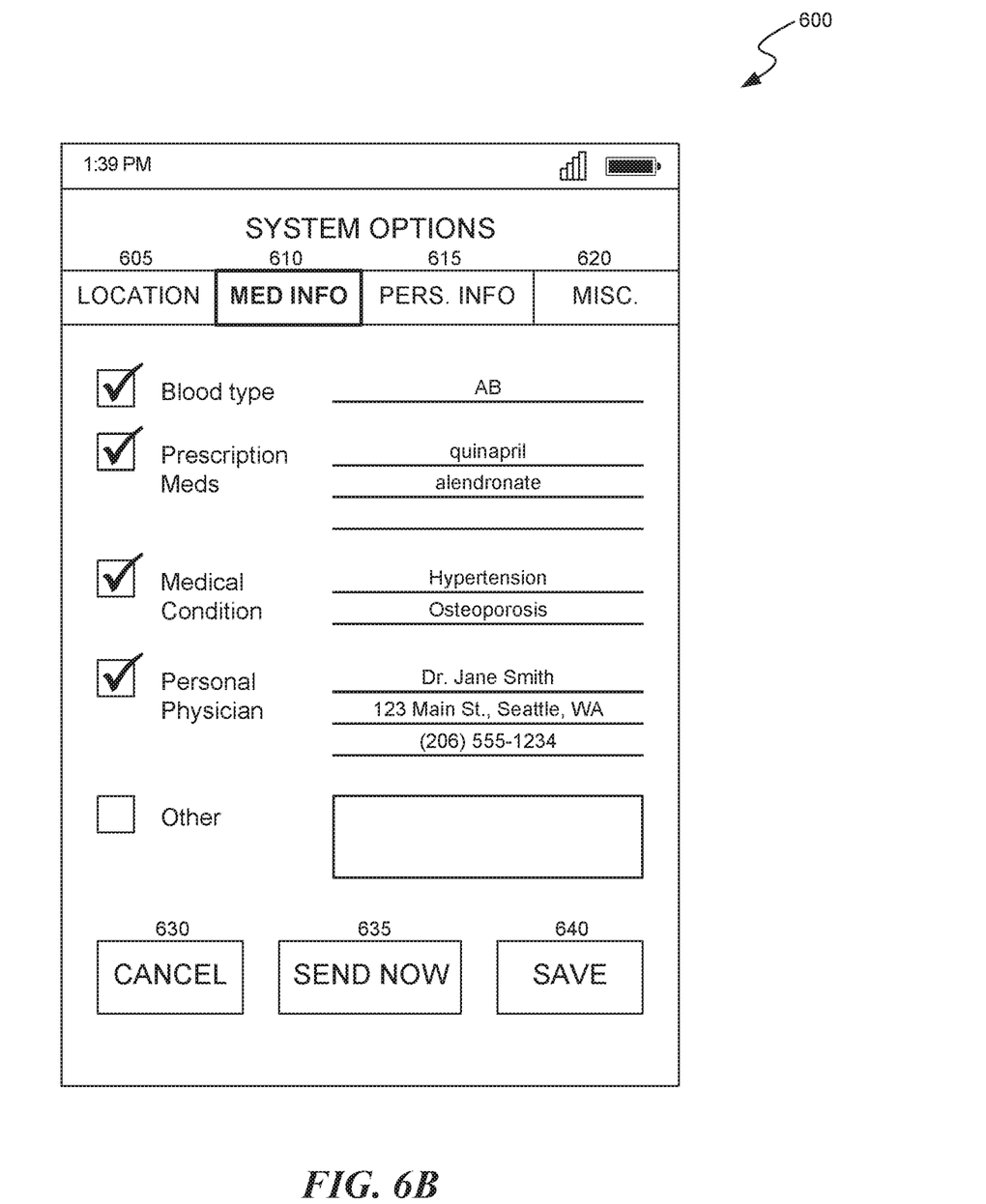
Figure 6C:
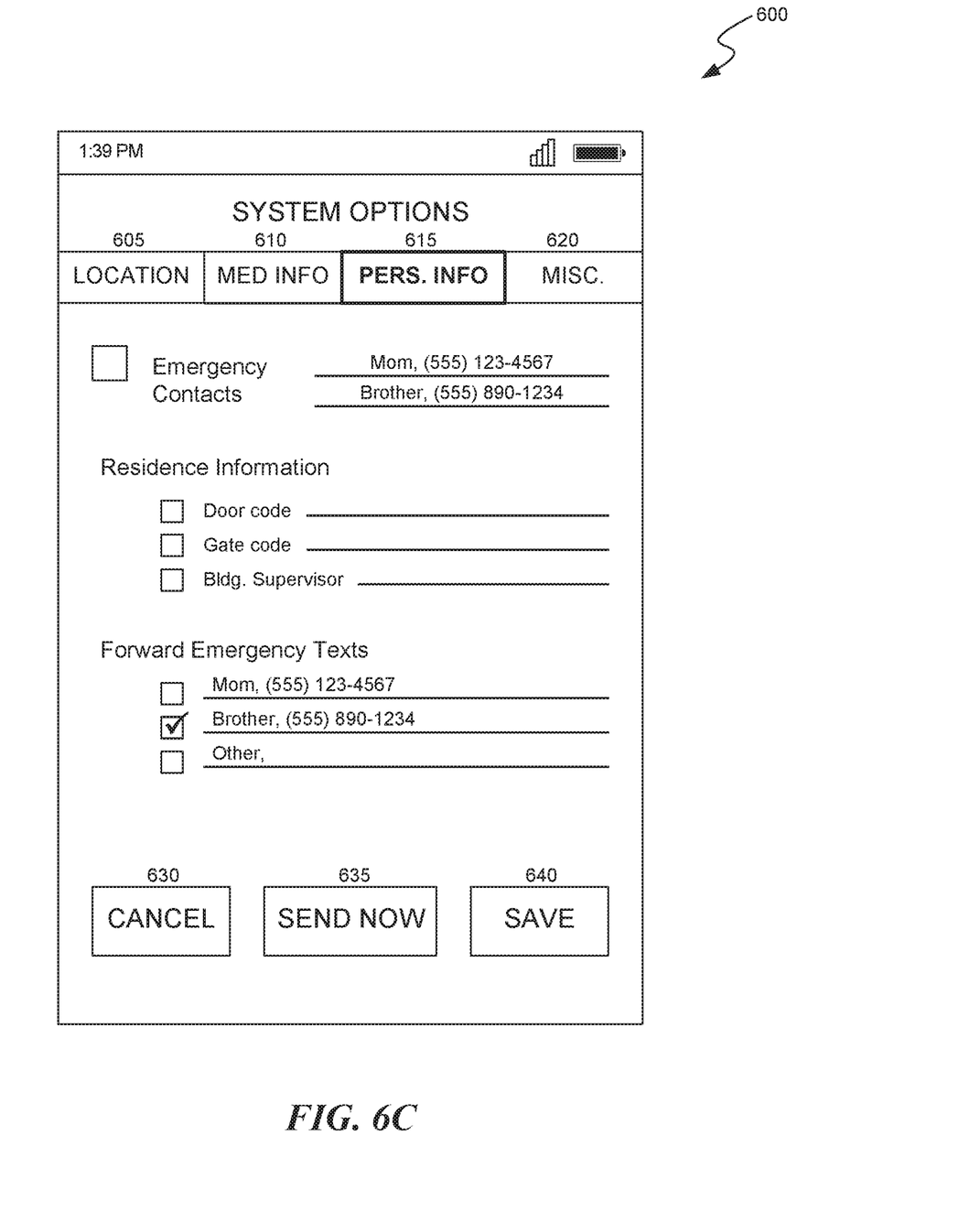
Figure 6D:
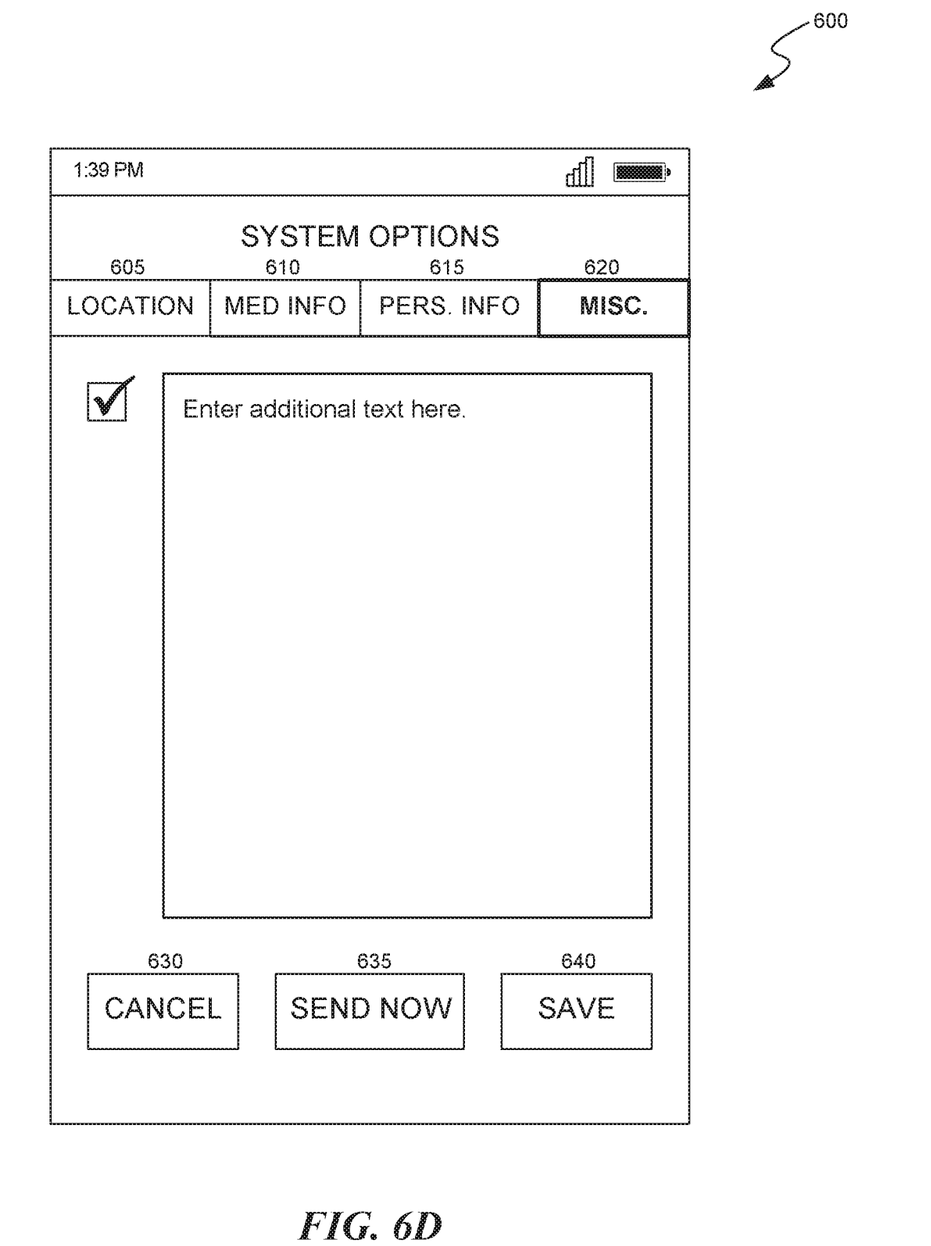

In response to receiving a user selection of options button 430 or 535, the system may cause mobile device 100 to display an interface for setting system options. In some embodiments, the disclosed system may prompt the mobile device user to provide authentication credentials (e.g., via lock screen 300) and may display an interface for setting system options only if authentication is successful. FIGS. 6A-6D illustrate an embodiment of a system options interface 600. System options interface 600 contains four tabs: Tab 605 for setting location options as illustrated in FIG. 6A; tab 610 for setting medical information options as illustrated in FIG. 6B; tab 615 for setting personal information options as illustrated in FIG. 6C; and tab 620 for setting miscellaneous options as illustrated in FIG. 6D. Each tab of system options interface 600 may include a cancel button 630, a send now button 635, and a save button 640. A user may exit system options interface 600 without saving any changes to system options by selecting cancel button 630. Conversely, a user may exit system options interface 600 while saving changes made to system options by selecting save button 640. In addition, a user may select send now button 635 to manually initiate transmission of information that is selected on the currently displayed tab or to manually initiate transmission of information that is selected on all tabs.

FIG. 6A illustrates an embodiment of a location options tab 605 of system options interface 600. Location options tab 605 includes options for automatically sharing, along with an emergency message, information including a current location, audio data, video data, and motion data of mobile device 100. The shared location may be gathered from a GPS unit or other internal mechanism in the mobile device for determining the location of the mobile device. Audio and video data may be obtained from the microphone and/or camera built into mobile device 100. In addition, motion data may be obtained from an accelerometer or other motion sensor present in mobile device 100. For example, a user may specify that current location, audio, and motion data should be sent automatically with an emergency message (as indicated by the respective check marks) but that video data should not be sent automatically (as indicated by the lack of a check mark next to the video data option). In some embodiments, the system may limit the types of information that are transmitted, regardless of user selections, if the system determines that the mobile device battery charge is below a predetermined threshold.

FIG. 6B illustrates an embodiment of a medical information options tab 610 of system options interface 600. Medical information options tab 610 includes options for automatically sharing, along with an emergency message, medical information including blood type, prescription medications, known medical conditions, personal physician, and other information that a user may specify as freeform text. FIG. 6C illustrates an embodiment of a personal information options tab 615 of system options interface 600. Personal information options tab 615 includes options for automatically sharing, along with an emergency message, emergency contact information and residence information such as door code, gate code, and building supervisor contact information. In addition, personal information options tab 615 may include an option to forward messages in the emergency messaging session to a personal contact such that the contact can monitor the status of the messaging session in real time or near real time. FIG. 6D illustrates an embodiment of a miscellaneous options tab 620 of system options interface 600. Miscellaneous options tab 620 of system options interface 600 includes a section for a user to enter freeform text containing any message or information that the user wants to be automatically transmitted to an emergency responder along with an emergency message.

Returning to FIG. 2, at block 220, the system retrieves user preferences stored on a memory of mobile device 100 regarding emergency messaging sessions. The system may initially set user preferences to default settings specified by a telecommunications provider or by an original equipment manufacturer. As explained herein with respect to FIGS. 6A-6D, user preferences may include whether to automatically send a user's location with an emergency message and whether to automatically update the user's location at a default or specified time interval. User preferences may include whether to automatically send one or more of the following types of data: audio, video, or motion information (e.g., accelerometer data) of the mobile device; medical information including blood type, prescription medications, known medical conditions, and physician information; personal information such as emergency contacts, residence information (e.g., residential address and access codes for door gate, etc.). In addition, user preferences may include whether to automatically send a predetermined message (e.g., freeform text entered by a user, such as instructions regarding a pet or a location of medical or legal documents), or whether to automatically forward sent and received messages in the messaging session to one or more specified emergency contacts. A person of ordinary skill in the art will appreciate that the foregoing list is not exhaustive and that additional user preferences are possible.

At block 225, the system receives a request from a user to transmit an emergency message to an emergency responder, and at block 230 the system initiates the emergency messaging session by transmitting the emergency message. In an embodiment, the transmit request may be received when the user taps a send button on the emergency messaging session interface. In this embodiment, the system may send the emergency message—along with any specific text entered by the user—to one or more providers that have been selected on the emergency messaging session screen, such as medical, fire, or police. If no provider type was selected, then the system may transmit the emergency message to a default provider. In another embodiment, the system may transmit the emergency message, along with any specific message entered by the user, in response to the user selecting a first type of emergency responder. When the emergency messaging session is initiated, the system displays a messaging window that displays messages exchanged between the user and the emergency provider(s). Additional details regarding the are discussed herein with respect to FIG. 5.

At block 235, the system automatically sends information as specified in the system preferences (e.g., FIGS. 6A-6D). For example, if the user preferences indicate that the user's physical location is to be sent with the emergency message, then the system automatically transmits the user's location. At block 240, the system monitors the messaging session to determine whether the session is still active. The emergency session is still active if the user has not terminated the session, for example by selecting a cancel icon on the messaging screen, or if the session has been terminated by the emergency provider. If the system determines that the messaging session has been canceled, the system may simply return to the lock screen 300 at block 205. If the system determines that the messaging session is still in progress, then the system proceeds to block 245 and sends updated user information as specified in the system preferences. The system may send updated user information at predetermined intervals that may be set by default, by a telecommunications network administrator, or by a user (e.g., sending updated location information every 45 seconds or sending the user's heart rate every 120 seconds).

At block 250, the system determines whether any changes have been made to system preferences, such as system preferences discussed above with respect to FIGS. 6A-6D. If no changes have been made to system preferences, then the system returns to block 240 (to continue monitoring whether the messaging session is active) and 250 (to update user information in accordance to the same system preferences). If changes have been made to system preferences, the system proceeds to block 255 to save the changes. The system then returns to block 240 (to continue monitoring whether the messaging session is active) and 250 (to update user information in accordance to the changed system preferences) until the emergency messaging session is no longer active.

Remarks

The Figures and above description provide a brief, general description of a suitable environment in which the invention can be implemented. Although not required, aspects of the invention may be implemented in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device or single computer, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices. Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. When statements or subject matter in an incorporated by reference conflict with statements or subject matter of this application, then this application shall control.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, certain aspects of the disclosed system be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

I claim:

1. A mobile or wearable system adapted to facilitate an emergency messaging session with an emergency responder, the system comprising:
  at least one memory;
  at least one power supply;
  at least one display device;
  at least one wireless transceiver for exchanging information over a wireless telecommunications network; and
  at least one processor coupled to the at least one memory, the at least one power supply, the at least one display, and the at least one wireless transceiver, wherein the at least one memory stores instructions, which when executed by the at least one processor, perform operations comprising:
    providing on the at least one display of the mobile or wearable system a first option to configure one or more types of user information to be sent automatically in an emergency messaging session and a second option to initiate the emergency messaging session while the mobile or wearable system is displaying a lock screen;
    displaying, while the mobile or wearable system remains locked, an emergency messaging session interface comprising:
        a control to enable a user selection of at least one Public Safety Answering Point (PSAP) type corresponding to an emergency provider; and
        a messaging window to receive at least one text message to be automatically sent to the emergency provider by the mobile or wearable system and via the wireless telecommunications network; and
    receiving an input to cause the user selection and the received at least one text message to be sent to the emergency provider by the mobile or wearable system while the mobile or wearable system remains locked,
        wherein a subset of the one or more types of user information is automatically sent to the emergency provider together with the at least one text message in case a charge of the at one least power supply is below a predetermined threshold.

2. The mobile or wearable system of claim 1, wherein the one or more types of user information to be sent automatically in the emergency messaging session comprises at least two of: a blood type of the user, a medication prescribed to the user, a medical condition of the user, a personal physician of the user, an emergency contact of the user, a door code for a residence of the user, a gate code for a residence of the user, or building supervisor contact information for a residence of the user.

3. The mobile or wearable system of claim 1, wherein the at least one PSAP type is a medical emergency responder, a fire emergency responder, or a police emergency responder.

4. The mobile or wearable system of claim 1, wherein the emergency session interface includes an option interface to allow the user to provide health or safety related information, the health or safety related information including at least two of: a currently location of the mobile device or wearable device, audio data of the mobile device or wearable device, video data of the mobile device or wearable device, or motion data of the mobile device or wearable device, and wherein the operations further comprise displaying data received via a selected emergency service provider, wherein received data includes first aid videos, or status of and arrival time for emergency personnel.

5. The mobile or wearable system of claim 1, wherein the emergency session interface includes an options button to enable system options to be set, and a back button to navigate away from the messaging window.

6. The mobile or wearable system of claim 1, wherein the operations further comprise:
    providing on the display of the mobile device or wearable device an option to enable a personal contact of the user to monitor a status of the emergency messaging session in real time or near real time.

7. At least one non-transitory computer-readable medium carrying instructions, which when executed by at least one data processor, performs operations for use with a wireless telecommunications network, the operations comprising:
    providing on a display of a mobile device or wearable device a first option to configure one or more types of user information to be sent automatically in an emergency messaging session and a second option to initiate the emergency messaging session while the mobile device or wearable device is displaying a lock screen;
    displaying, while the mobile or wearable system remains locked, an emergency messaging session interface comprising:
        a control to enable a user selection of at least one Public Safety Answering Point (PSAP) type corresponding to an emergency provider; and
        a messaging window to receive at least one text message to be automatically sent to the emergency provider by the mobile device or wearable device and via the wireless telecommunications network; and
    receiving an input to cause the user selection and the received at least one text message to be sent while the mobile or wearable system remains locked,
        wherein a subset of the one or more types of user information is automatically sent to the emergency provider together with the at least one text message in case a battery charge of the mobile device or wearable device is below a predetermined threshold.

8. The computer-readable medium of claim 7, wherein the one or more types of user information to be sent automatically in the emergency messaging session comprises at least two of: a blood type of the user, a medication prescribed to the user, a medical condition of the user, a personal physician of the user, an emergency contact of the user, a door code for a residence of the user, a gate code for a residence of the user, or building supervisor contact information for a residence of the user.

9. The computer-readable medium of claim 7, wherein the at least one PSAP type is a medical emergency responder, a fire emergency responder, or a police emergency responder.

10. The computer-readable medium of claim 7, wherein the one or more types of user information to be sent automatically in the emergency messaging session comprises at least one of a current location of the mobile device or wearable device, audio data of the mobile device or wearable device, video data of the mobile device or wearable device, or motion data of the mobile device or wearable device.

11. The computer-readable medium of claim 7, wherein the emergency messaging session interface includes an options button to enable system options to be set, and a back button to navigate away from the messaging window.

12. The computer-readable medium of claim 7, wherein the emergency messaging session interface is configured to permit data to be received from the emergency provider, wherein the data includes first aid videos.

13. The computer-readable medium of claim 7, wherein the emergency messaging session interface enables selection of one or more predetermined options, and wherein the predetermined options and the certain messages to be transmitted depends upon a type of selected emergency service provider.

14. The computer-readable medium of claim 7, wherein the one or more types of user information to be sent automatically in the emergency messaging session comprises at least two of: a currently location of the mobile device or wearable device, audio data of the mobile device or wearable device, video data of the mobile device or wearable device, or motion data of the mobile device or wearable device, and wherein the operations further comprise displaying data received via a selected emergency service provider, wherein received data includes first aid videos, or status of and arrival time for emergency personnel.

15. A mobile or wearable system adapted to facilitate an emergency messaging session with an emergency responder, the system comprising:
   at least one memory;
   at least one power supply;
   at least one display device;
   at least one wireless transceiver for exchanging information over a wireless telecommunications network; and
   at least one processor coupled to the at least one memory, the at least one power supply, the at least one display, and the at least one wireless transceiver, wherein the at least one memory stores instructions, which when executed by the at least one processor, perform operations comprising:
   providing on the display of the mobile or wearable system a first option to configure one or more types of user information to be sent automatically in an emergency messaging session and a second option to initiate the emergency messaging session with an emergency provider while the mobile or wearable system is displaying a lock screen;
   displaying, while the mobile or wearable system remains locked, an emergency messaging session interface that comprises an interactive messaging window to allow an exchange of at least two text messages between a user of the mobile or wearable system and the emergency provider, the exchange comprising: receiving, from the user, a first text message to be sent to the emergency provider by the mobile device or wearable system via the wireless telecommunications network; and displaying a second text message received from the network provider via the wireless telecommunications network in response to the first message;
   wherein a subset of the one or more types of user information is automatically sent to the emergency provider together with the at least one text message in case a charge of the at one least power supply is below a predetermined threshold.

16. The mobile or wearable system of claim 15, wherein the one or more types of user information to be sent automatically in the emergency messaging session includes at least a current location of the mobile device or wearable device, audio data of the mobile device or wearable device, video data of the mobile device or wearable device, or motion data of the mobile device or wearable device.

17. The mobile or wearable system of claim 15, wherein the emergency session interface includes an option interface to allow the user to provide health or safety related information, wherein the health or safety related information includes at least two of: a blood type of the user, a medication prescribed to the user, a medical condition of the user, a personal physician of the user, an emergency contact of the user, a door code for a residence of the user, a gate code for a residence of the user, or building supervisor contact information for a residence of the user.

18. The mobile or wearable system of claim 15, wherein the emergency session interface includes an option interface to allow the user to provide health or safety related information, wherein the health or safety related information includes at least two of: a currently location of the mobile device or wearable device, audio data of the mobile device or wearable device, video data of the mobile device or wearable device, or motion data of the mobile device or wearable device, and wherein the operations further comprise displaying data received via a selected emergency service provider, wherein received data includes first aid videos, or status of and arrival time for emergency personnel.

19. The mobile or wearable system of claim 15, wherein the operations further comprise:
   providing, while the mobile or wearable system remains locked, a control to enable a user to select at least one Public Safety Answering Point (PSAP) type corresponding to the emergency provider,
      wherein the at least one PSAP type is a medical emergency responder, a fire emergency responder, or a police emergency responder.

20. The mobile or wearable system of claim 15, wherein the operations further comprise:
   providing on the display of the mobile device or wearable device an option to enable a personal contact of the user to monitor a status of the emergency messaging session in real time or near real time.

* * * * *